(12) United States Patent
Xu et al.

(10) Patent No.: US 12,659,929 B2
(45) **Date of Patent: \*Jun. 16, 2026**

(54) PAGING EARLY INDICATION LOCATION DETERMINATION

(71) Applicant: QUALCOMM Incorporated, San Diego, CA (US)

(72) Inventors: Huilin Xu, Temecula, CA (US); Muhammad Nazmul Islam, Littleton, MA (US); Carsten Aagaard Pedersen, Bolton, MA (US); Peter Pui Lok Ang, San Diego, CA (US)

(73) Assignee: QUALCOMM Incorporated, San Diego, CA (US)

( \* ) Notice: Subject to any disclaimer, the term of this patent is extended or adjusted under 35 U.S.C. 154(b) by 324 days.

This patent is subject to a terminal disclaimer.

(21) Appl. No.: 18/464,675

(22) Filed: Sep. 11, 2023

(65) Prior Publication Data

US 2023/0422213 A1     Dec. 28, 2023

Related U.S. Application Data

(63) Continuation of application No. 17/944,896, filed on Sep. 14, 2022, now Pat. No. 11,812,409.

(Continued)

(51) Int. Cl.
 *H04W 68/02* (2009.01)
 *H04L 5/00* (2006.01)
(52) U.S. Cl.
 CPC ........... *H04W 68/02* (2013.01); *H04L 5/0051* (2013.01)

(58) Field of Classification Search
 CPC ..... Y02D 30/70; H04L 5/0051; H04L 5/0053; H04L 5/0094; H04W 52/0216;
 (Continued)

(56) References Cited

U.S. PATENT DOCUMENTS 10,694,493 B2   6/2020  Yerramalli et al.
10,721,712 B2   7/2020  Islam et al.
 (Continued)

FOREIGN PATENT DOCUMENTS

CA     2750554 A1    5/2012
CN     112136349 A   12/2020
 (Continued)

OTHER PUBLICATIONS

CATT: "Paging Enhancement for UE Power Saving", R1-2200149, 3GPP TSG RAN WG1 #107bis-e, e-Meeting, Jan. 17-25, 2022, pp. 1-10.

(Continued)

*Primary Examiner* — Siu M Lee
(74) *Attorney, Agent, or Firm* — Dinsmore & Shohl LLP

(57) ABSTRACT

Certain aspects of the present disclosure provide techniques for PEI location determination. According to certain aspects, a method of wireless communication by a user equipment (UE) includes receiving, from a network entity, a configuration of a paging early indication (PEI) that indicates, for multiple paging occasions (POs) in multiple paging frames (PFs), whether paging physical downlink control channels (PDCCHs) are scheduled in the multiple POs, identifying a reference PF from one of the multiple PFs, and monitoring for the PEI in a location of a PEI occasion determined based on the reference PF and at least one timing offset.

22 Claims, 11 Drawing Sheets

Related U.S. Application Data

(60) Provisional application No. 63/266,558, filed on Jan. 7, 2022.

(58) Field of Classification Search
CPC ......... H04W 52/0254; H04W 52/0225; H04W 68/02; H04W 68/025; H04W 68/005; H04W 72/23
See application file for complete search history.

(56) References Cited

U.S. PATENT DOCUMENTS

| | | | | |
|---|---|---|---|---|
| 11,812,409 | B2 * | 11/2023 | Xu | H04L 5/0051 |
| 2012/0122495 | A1 * | 5/2012 | Weng | H04W 68/025 |
| | | | | 455/458 |
| 2022/0124674 | A1 | 4/2022 | Babaei | |
| 2022/0132464 | A1 * | 4/2022 | Agiwal | H04W 68/02 |
| 2023/0224856 | A1 | 7/2023 | Xu et al. | |
| 2023/0232325 | A1 * | 7/2023 | Ye | H04W 52/0216 |
| | | | | 455/574 |
| 2024/0049182 | A1 * | 2/2024 | Zhou | H04W 72/232 |
| 2024/0064700 | A1 * | 2/2024 | Zhang | H04W 52/0216 |
| 2024/0292372 | A1 * | 8/2024 | Nagano | H04W 4/14 |

FOREIGN PATENT DOCUMENTS

| | | |
|---|---|---|
| WO | 2019023254 | 1/2019 |
| WO | 2019139990 | 7/2019 |
| WO | 2021175032 A1 | 9/2021 |
| WO | 2021180206 A1 | 9/2021 |
| WO | 2021238993 A1 | 12/2021 |
| WO | 2022083756 A1 | 4/2022 |

OTHER PUBLICATIONS

CATT: "Remaining Issues of Paging Enhancement for UE Power Saving", 3GPP TSG RAN WG1 #108-e, R1-2201370, 3rd Generation Partnership Project, Mobile Competence Centre, 650, Route Des Lucioles, F-06921 Sophia-Antipolis Cedex, France, vol. RAN WG1, No. e-Meeting, Feb. 21, 2022-Mar. 3, 2022, Feb. 14, 2022, XP052109429, 13 pages, The whole document.

International Search Report and Written Opinion—PCT/US2023/060183—ISA/EPO—Mar. 31, 2023.

Lenovo, et al., "Paging Enhancement for UE Power Saving", 3GPP TSG RAN WG1 Meeting #1 06bis-e, R1-2109944, 3rd Generation Partnership Project, Mobile Competence Centre, 650, Route Des Lucioles, F-06921 Sophia-Antipolis Cedex, France, vol. RAN WG1, No. e-Meeting, Oct. 11, 2021-Oct. 19, 2021, Oct. 2, 2021, 4 Pages, XP052058862, The whole document.

Mediatek Inc: "Summary #1 of Paging Enhancements", 3GPP TSG RAN WG1 #107-e, R1-2112307, 3rd Generation Partnership Project, Mobile Competence Centre, 650, Route Des Lucioles, F-06921 Sophia-Antipolis Cedex, France, vol. RAN WG1, No. e-Meeting, Nov. 11, 2021-Nov. 19, 2021, Nov. 15, 2021, XP052097747, 59 pages, pp. 37-41.

Moderator (Mediatek): "Summary#1 of Paging Enhancements", 3GPP TSG RAN WG1 #106-e, R1-2108310, 3rd Generation Partnership Project, Mobile Competence Centre, 650, Route Des Lucioles, F-06921 Sophia-Antipolis Cedex, France, vol. RAN WG1, No. e-Meeting, Aug. 16, 2021-Aug. 27, 2021, Aug. 18, 2021, XP052042121, 79 pages, pp. 1-2, 15.

Moderator (Mediatek): "Summary#5 of Paging Enhancements", 3GPP TSG RAN WG1 #106bis-e, R1-2110671, 3rd Generation Partnership Project, Mobile Competence Centre, 650, Route Des Lucioles, F-06921 Sophia-Antipolis Cedex, France, vol. RAN WG1, No. e-Meeting, Oct. 11, 2021-Oct. 19, 2021, Oct. 22, 2021, XP052065871, 51 Pages, pp. 4-5, 19, 23, 29-34, 39, 42-43, Paragraph 4.1.

Qualcomm Incorporated: "Paging Enhancements for Idle and Inactive UE Power Saving", 3GPP TSG-RAN WG1 #107-bis-e, R1-2200298, 3rd Generation Partnership Project, Mobile Competence Centre, 650, Route Des Lucioles, F-06921 Sophia-Antipolis Cedex, France, vol. RAN WG1, No. e-Meeting, Jan. 17, 2022-Jan. 25, 2022, Jan. 11, 2022, XP052098157, 10 pages, the whole document.

Qualcomm Incorporated: "Paging Enhancements for Idle/Inactive UE Power Saving", 3GPP TSG-RAN WG1 #107-e, R1-2112226, 3rd Generation Partnership Project, Mobile Competence Centre, 650, Route Des Lucioles, F-06921 Sophia-Antipolis Cedex, France, vol. RAN WG1, No. e-Meeting, Nov. 11, 2021-Nov. 19, 2021, Nov. 6, 2021, XP052075332, 7 pages, pp. 1-5.

ZTE, et al., "Remaining Issues of Power Saving Enhancements for Paging", 3GPP TSG RAN WG1 #107b-e, R1-2200066, 3rd Generation Partnership Project, Mobile Competence Centre, 650, Route Des Lucioles, F-06921 Sophia-Antipolis Cedex, France, vol. RAN WG1, No. e-Meeting, Jan. 17, 2022-Jan. 25, 2022, Jan. 11, 2022, XP052092911, pp. 1-8, The whole document.

CMCC: "Discussion on Paging Early Indication Design", 3GPP TSG RAN WG1 #107-e, R1-2111617, e-Meeting, Nov. 11-19, 2021, Nov. 5, 2021, 4 Pages.

Mediatek Inc: "Summary #1 of Paging Enhancements", 3GPP TSG RAN WG1 #107-e, R1-2112307, 3rd Generation Partnership Project, Mobile Competence Centre, 650, Route Des Lucioles, F-06921 Sophia-Antipolis Cedex, France, vol. RAN WG1, No. e-Meeting, Nov. 11, 2021-Nov. 19, 2021, Nov. 15, 2021, 59 Pages.

Moderator (Mediatek): "Summary #3 of Paging Enhancements", 3GPP TSG RAN WG1 #107-e, R1-2112886, e-Meeting, Nov. 11-19, 2021, 78 Pages.

Moderator (Mediatek): "Summary#5 of Paging Enhancements", 3GPP TSG RAN WG1 #106bis-e, R1-2110671, 3rd Generation Partnership Project, Mobile Competence Centre, 650, Route Des Lucioles, F-06921 Sophia-Antipolis Cedex, France, vol. RAN WG1, No. e-Meeting, Oct. 11, 2021-Oct. 19, 2021, Oct. 22, 2021, 51 Pages.

Qualcomm Incorporated: "Paging Enhancements for Idle/Inactive UE Power Saving", 3GPP TSG-RAN WG1 #107-e, R1-2112226, 3rd Generation Partnership Project, Mobile Competence Centre, 650, Route Des Lucioles, F-06921 Sophia-Antipolis Cedex, France, vol. RAN WG1, No. e-Meeting, Nov. 11, 2021-Nov. 19, 2021, Nov. 6, 2021, 7 Pages.

* cited by examiner

500

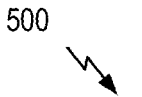

```
┌──────────┐                                    ┌──────────┐
│    UE    │                                    │   gNB    │
└──────────┘                                    └──────────┘
     │                                               │
     │          PEI Configuration (for PEI that      │
  ┌─────┐       maps to POs in multiple PFs)         │
  │ PEI │◄──────────────────────────────────────────┤
  │Occasion                                          │
  └─────┘                                            │
     │                                               │
 ┌─────────────────────┐                             │
 │ Determine location of a                           │
 │ PEI occasion based on a                           │
 │ reference PF, frame/                              │
 │ symbol-level offsets │                            │
 └─────────────────────┘                             │
     │                                               │
 ┌─────────────────────┐                             │
 │ Monitor for PEI at the                            │
 │ determined location of                            │
 │ the PEI occasion     │                            │
 └─────────────────────┘                             │
     │                                               │
┌──────────────────┐         PDCCH-based PEI         │
│ PDCCH Monitoring │◄────────────────────────────────┤
│ Occasion (PMO) for PEI                              │
└──────────────────┘                                 │
     │                                               │
```

*FIG. 5*

Figures 6A, 6B:
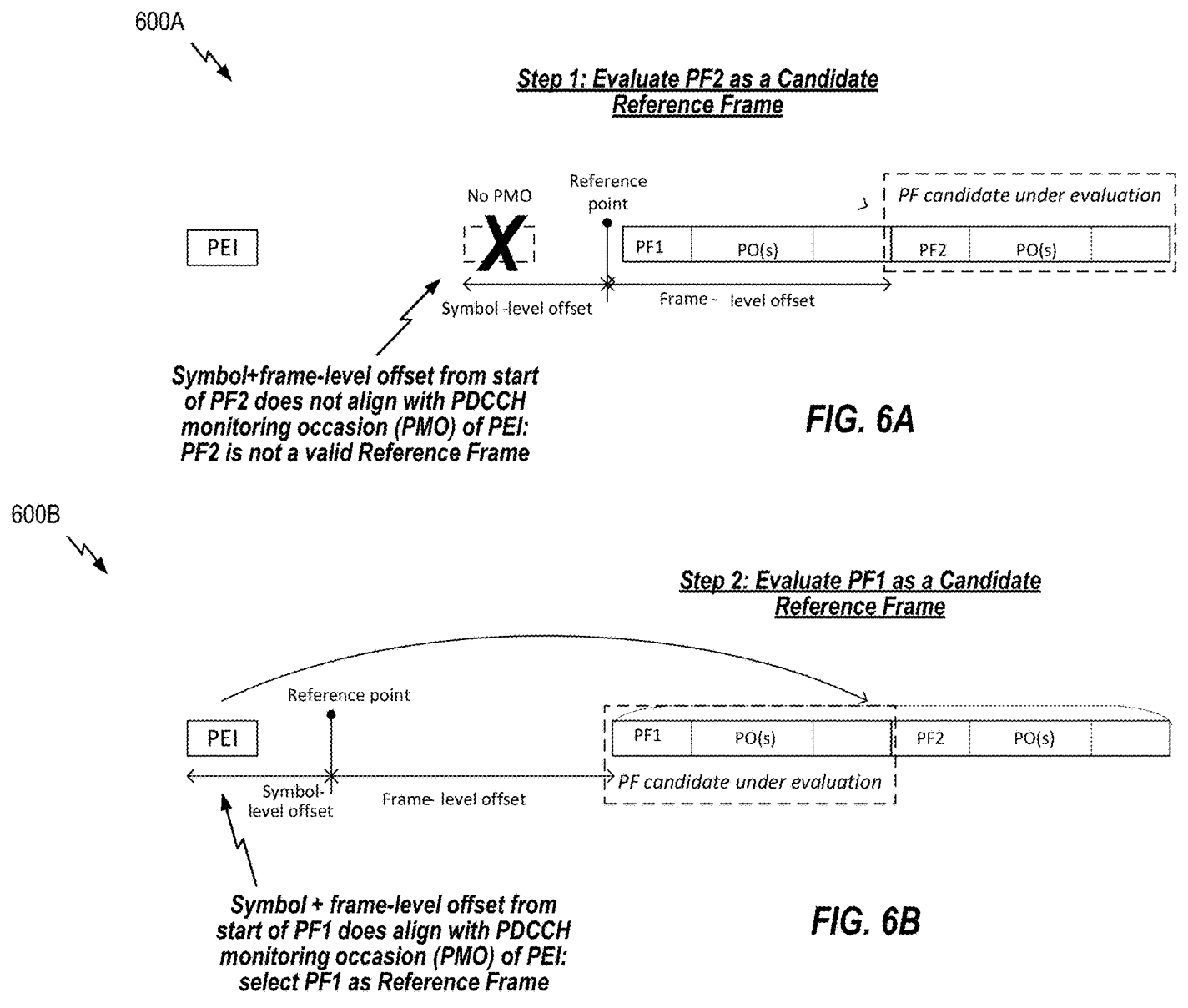

Step 1: Evaluate PF2 as a Candidate Reference Frame

PF candidate under evaluation

PEI

No PMO

Reference point

Symbol-level offset

Frame-level offset

PF1  PO(s)  PF2  PO(s)

Symbol+frame-level offset from start of PF2 does not align with PDCCH monitoring occasion (PMO) of PEI: PF2 is not a valid Reference Frame

Step 2: Evaluate PF1 as a Candidate Reference Frame

PF candidate under evaluation

PEI

Reference point

Symbol-level offset

Frame-level offset

PF1  PO(s)  PF2  PO(s)

Symbol + frame-level offset from start of PF1 does align with PDCCH monitoring occasion (PMO) of PEI: select PF1 as Reference Frame

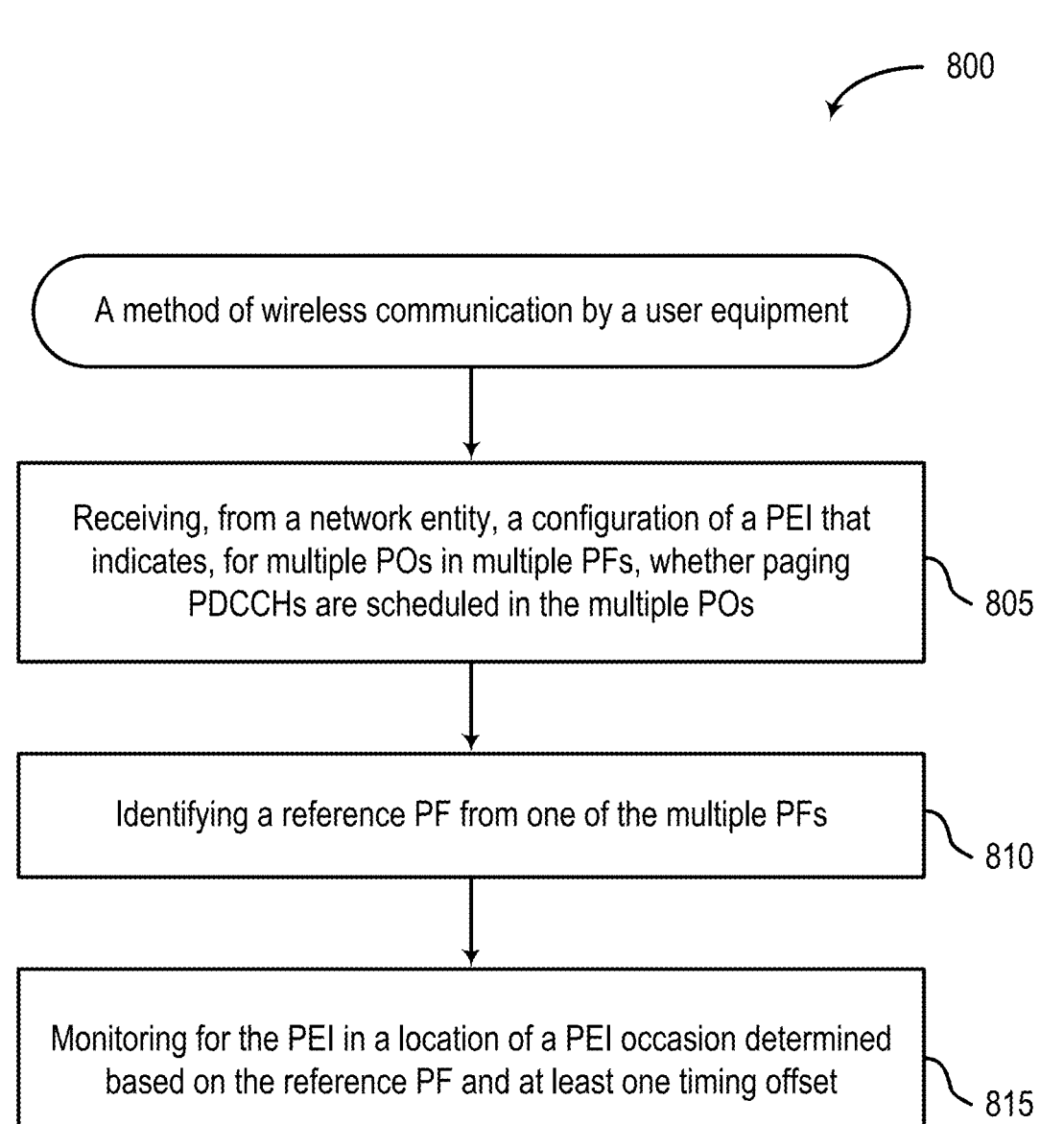

800

A method of wireless communication by a user equipment

Receiving, from a network entity, a configuration of a PEI that indicates, for multiple POs in multiple PFs, whether paging PDCCHs are scheduled in the multiple POs

805

Identifying a reference PF from one of the multiple PFs

810

Monitoring for the PEI in a location of a PEI occasion determined based on the reference PF and at least one timing offset

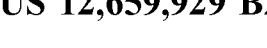
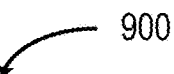

900

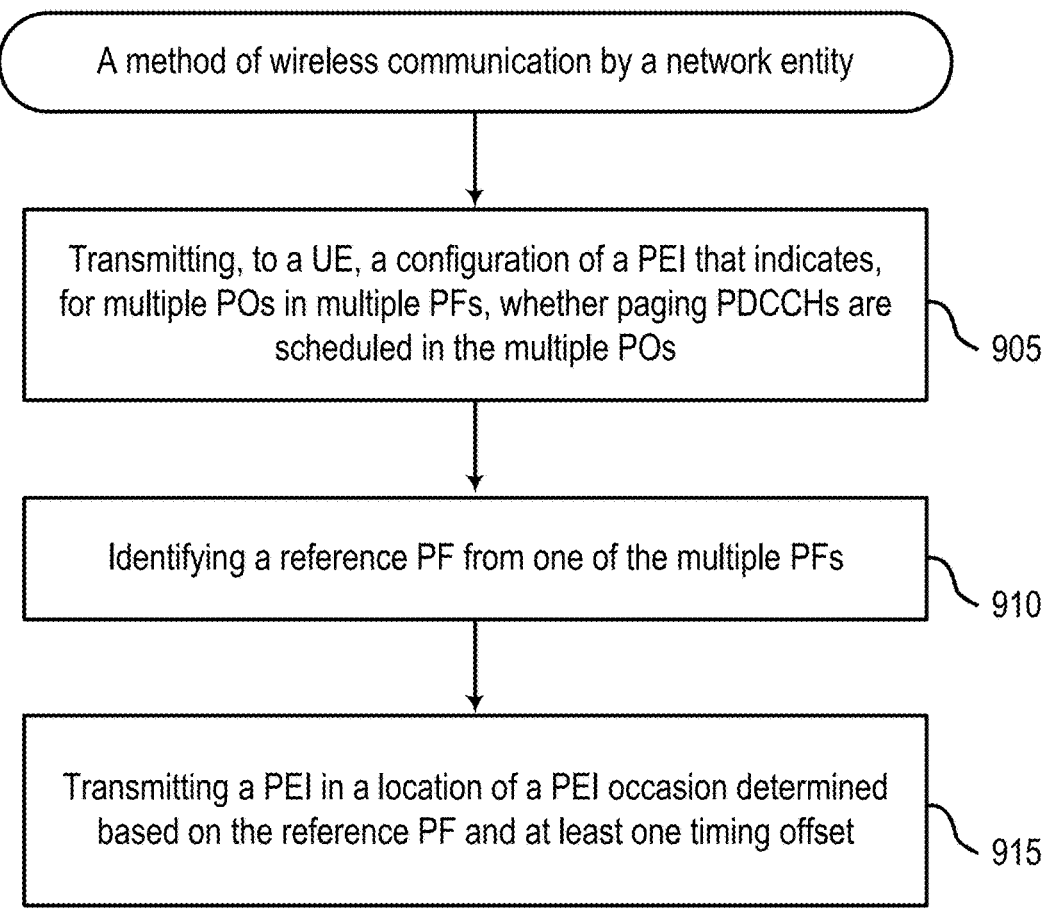

A method of wireless communication by a network entity

Transmitting, to a UE, a configuration of a PEI that indicates, for multiple POs in multiple PFs, whether paging PDCCHs are scheduled in the multiple POs

905

Identifying a reference PF from one of the multiple PFs

910

Transmitting a PEI in a location of a PEI occasion determined based on the reference PF and at least one timing offset

PAGING EARLY INDICATION LOCATION DETERMINATION

CROSS-REFERENCE TO RELATED APPLICATION(S)

This present application is a continuation of U.S. patent application Ser. No. 17/944,896, filed Sep. 14, 2022, which claims priority to and the benefit of U.S. Provisional Application No. 63/266,558, filed Jan. 7, 2022, which is assigned to the assignee of the present application and is expressly incorporated by reference in its entirety.

INTRODUCTION

Aspects of the present disclosure relate to wireless communications, and more particularly, to techniques for locating paging early indication (PEI) occasions.

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division orthogonal frequency division, single-carrier frequency division, or time division synchronous code division, to name a few. These and other multiple access technologies have been adopted in various telecommunication standards to provide a common protocol that enables different wireless devices to communicate on a municipal, national, regional, and even global level.

Although wireless communication systems have made great technological advancements over many years, challenges still exist. For example, complex and dynamic environments can still attenuate or block signals between wireless transmitters and wireless receivers, undermining various established wireless channel measuring and reporting mechanisms, which are used to manage and optimize the use of finite wireless channel resources. Consequently, there exists a need for further improvements in wireless communications systems to overcome various challenges.

SUMMARY

One aspect provides a method of wireless communication by a user equipment (UE), including receiving, from a network entity, a configuration of a paging early indication (PEI) that indicates, for multiple paging occasions (POs) in multiple paging frames (PFs), whether paging physical downlink control channels (PDCCHs) are scheduled in the multiple POs; identifying a reference PF from one of the multiple PFs; and monitoring for the PEI in a location of a PEI occasion determined based on the reference PF and at least one timing offset.

One aspect provides a method of wireless communication by a network entity, including transmitting, to a UE, a configuration of a PEI that indicates, for multiple POs in multiple PFs, whether paging PDCCHs are scheduled in the multiple POs; identifying a reference PF from one of the multiple PFs; and transmitting a PEI in a location of a PEI occasion determined based on the reference PF and at least one timing offset.

Other aspects provide: an apparatus operable, configured, or otherwise adapted to perform the aforementioned methods as well as those described elsewhere herein; a non-transitory, computer-readable media comprising instructions that, when executed by one or more processors of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF THE DRAWINGS

The appended figures depict certain features of the various aspects described herein and are not to be considered limiting of the scope of this disclosure.

FIG. 5 depicts a call flow diagram for PEI occasion location determination, in accordance with certain aspects of the present disclosure.

FIG. 6A and FIG. 6B depict an example of PEI occasion location determination, in accordance with certain aspects of the present disclosure.

FIGS. 8 and 9 depict example processes of wireless communication according to aspects of the present disclosure.

DETAILED DESCRIPTION

Figure 1:
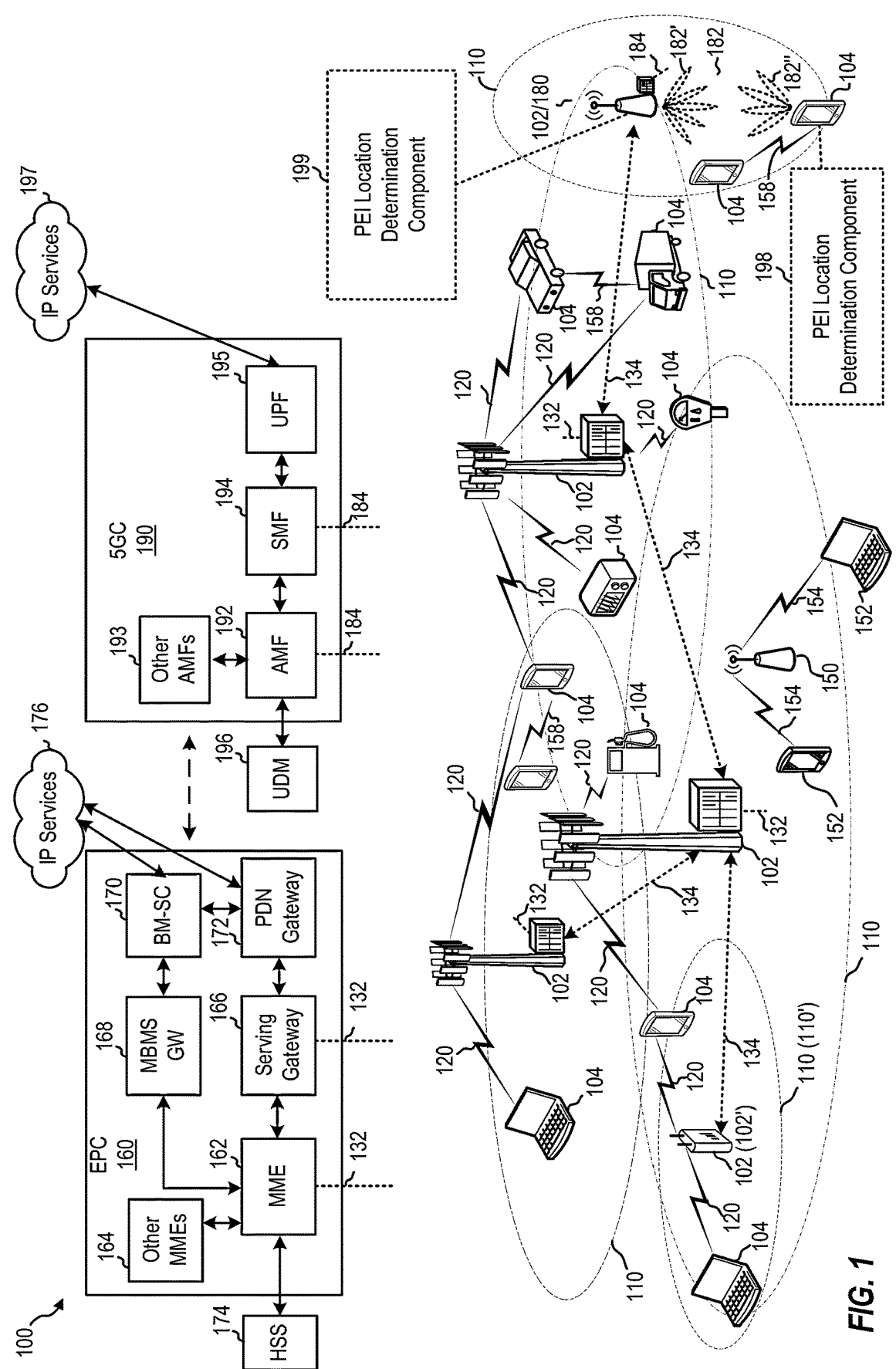
FIG. 1 is a block diagram conceptually illustrating an example wireless communication network.

Aspects of the present disclosure provide apparatuses, methods, processing systems, and computer-readable mediums for determining the location of paging early indication (PEI) occasions. The techniques may allow a user equipment (UE) and base station (BS) to coordinate the location and be synchronized as to the location of a physical downlink control channel (PDCCH) monitoring occasion to be used for a PEI.

A UE may save battery power by entering an idle or inactive mode while monitoring paging information (e.g., at sparse occasions), such as a PDCCH, from the network to receive system information block (SIB) updates, earthquake and tsunami warning system (ETWS) messages, and/or various other messages when the UE is paged. To allow the UE to stay in a low power state longer, a PEI may be used.

A PEI generally refers to a signal or message that is used as a preceding notice before the transmission of actual paging messages in corresponding paging occasions (POs). By monitoring for PEIs, the UE may only monitor subsequent POs for paging if an associated PEI indicates paging for the UE in those POs. A potential advantage of such a PDCCH-based PEI is that it may convey more information than a sequence-based PEI. For example, a PDCCH-based PEI may be able to provide an indication for multiple POs. This aggregation of information may help reduce the signaling load on a paging channel. A PEI configuration may indicate what type of information is conveyed in a PDCCH-based PEI, such as the number of POs indicated by the PEI and a number of copies of PEIs transmitted (e.g., to increase the likelihood of a PEI being successfully received). PEI occasions (PEI-O) may be PEI PDCCH monitoring occasions transmitted on all synchronization signal block (SSB) beams.

In some systems, a single PEI may be used to indicate whether a UE is paged in one or multiple POs across multiple PFs. In such cases, the UE may determine a PEI-o to monitor by applying frame-level and system-level timing offsets from a reference point (in time), determined based on a start of a reference PF.

Unfortunately, there can be uncertainty about which PF is to be used as the reference PF for applying the frame-level timing offset. As a result, it might not always be clear which PF is to be used as the reference PF for applying the frame-level timing offset. This ambiguity may lead a UE to unnecessarily monitor too many PEI occasions, resulting in wasted processing power. Further, this ambiguity could also cause the UE to miss a PEI and the corresponding page, which may lead to delays in reaching the UE and degradation of system performance and user experience.

Aspects of the present disclosure provide various solutions that may help remove this ambiguity, helping a UE and base station stay synchronized as to the location of PEI occasions. For example, after receiving a configuration of a PEI that indicates whether paging PDCCHs are scheduled in multiple POs in multiple PFs, aspects of the present disclosure allow the UE to identify a reference PF from one of the multiple PFs. The UE may monitor for the PEI in a location of a PEI occasion determined based on the reference PF and a timing offset.

In some cases, the timing offset may include a frame-level timing offset and a symbol-level timing offset. In such cases, the UE determines the location of the PEI occasion by determining a reference point that is the frame-level timing offset before a start of the reference PF and determining a start of the PEI occasion that is the symbol-level timing offset before the reference point. Identifying the reference PF may involve identifying one of the multiple PFs whose start is offset, from a configured PDCCH monitoring occasion (PMO) of the PEI occasion, by the frame-level and symbol-level timing offset. In some cases, identifying the reference PF is based on a start offset configured by the network entity.

The proposed aspects may help remove uncertainty in reference timing, allowing a UE to uniquely identify a PEI-O to monitor. Removing uncertainty in reference timing may help the UE avoid monitoring too many PEI-Os, which may help avoid unnecessary power consumption. The proposed aspects may also help the UE avoid missing PEIs, which may help avoid delays in reaching the UE, thereby improving system performance and user experience.

Introduction to Wireless Communication Networks

FIG. 1 depicts an example of a wireless communication network 100, in which aspects described herein may be implemented.

Generally, wireless communication network 100 includes base stations (BSs) 102, user equipments (UEs) 104, one or more core networks, such as an Evolved Packet Core (EPC) 160 and 5G Core (5GC) network 190, which interoperate to provide wireless communications services.

BSs 102 may provide an access point to the EPC 160 and/or 5GC 190 for a UE 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. Base stations may include and/or be referred to as a gNB, NodeB, eNB, ng-eNB (e.g., an eNB that has been enhanced to provide connection to both EPC 160 and 5GC 190), an access point, a base transceiver station, a radio base station, a radio transceiver, or a transceiver function, or a transmission reception point in various contexts.

A base station, such as BS 102, may include components that are located at a single physical location or components located at various physical locations. In examples in which the base station includes components that are located at various physical locations, the various components may each perform various functions such that, collectively, the various components achieve functionality that is similar to a base station that is located at a single physical location. As such, a base station may equivalently refer to a standalone base station or a base station including components that are located at various physical locations or virtualized locations. In some implementations, a base station including components that are located at various physical locations may be referred to as or may be associated with a disaggregated radio access network (RAN) architecture, such as an Open RAN (O-RAN) or Virtualized RAN (VRAN) architecture. In some implementations, such components of a base station may include or refer to one or more of a central unit (CU), a distributed unit (DU), or a radio unit (RU).

BSs 102 wirelessly communicate with UEs 104 via communications links 120. Each of BSs 102 may provide communication coverage for a respective geographic coverage area 110, which may overlap in some cases. For example, small cell 102' (e.g., a low-power base station) may have a coverage area 110' that overlaps the coverage area 110 of one or more macrocells (e.g., high-power base stations).

The communication links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communication links 120 may use multiple-input and multiple-output (MIMO) antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicles, heart monitor, or other IoT devices), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, base station 180 and the UE 104 may each include a plurality of antennas, such as antenna elements, antenna panels, and/or antenna arrays to facilitate the beamforming.

In some cases, base station 180 may transmit a beam-formed signal to UE 104 in one or more transmit directions 182'. UE 104 may receive the beamformed signal from the base station 180 in one or more receive directions 182". UE 104 may also transmit a beamformed signal to the base station 180 in one or more transmit directions 182". Base station 180 may also receive the beamformed signal from UE 104 in one or more receive directions 182'. Base station 180 and UE 104 may then perform beam training to deter-mine the best receive and transmit directions for each of base station 180 and UE 104. Notably, the transmit and receive directions for base station 180 may or may not be the same. Similarly, the transmit and receive directions for UE 104 may or may not be the same.

Wireless communication network 100 includes PEI loca-tion determination component 199, which may identify locations of configured PEI occasions. Wireless communi-cation network 100 further includes PEI location determi-nation component 198, which may be used to identify locations of configured PEI occasions.

Figure 2:
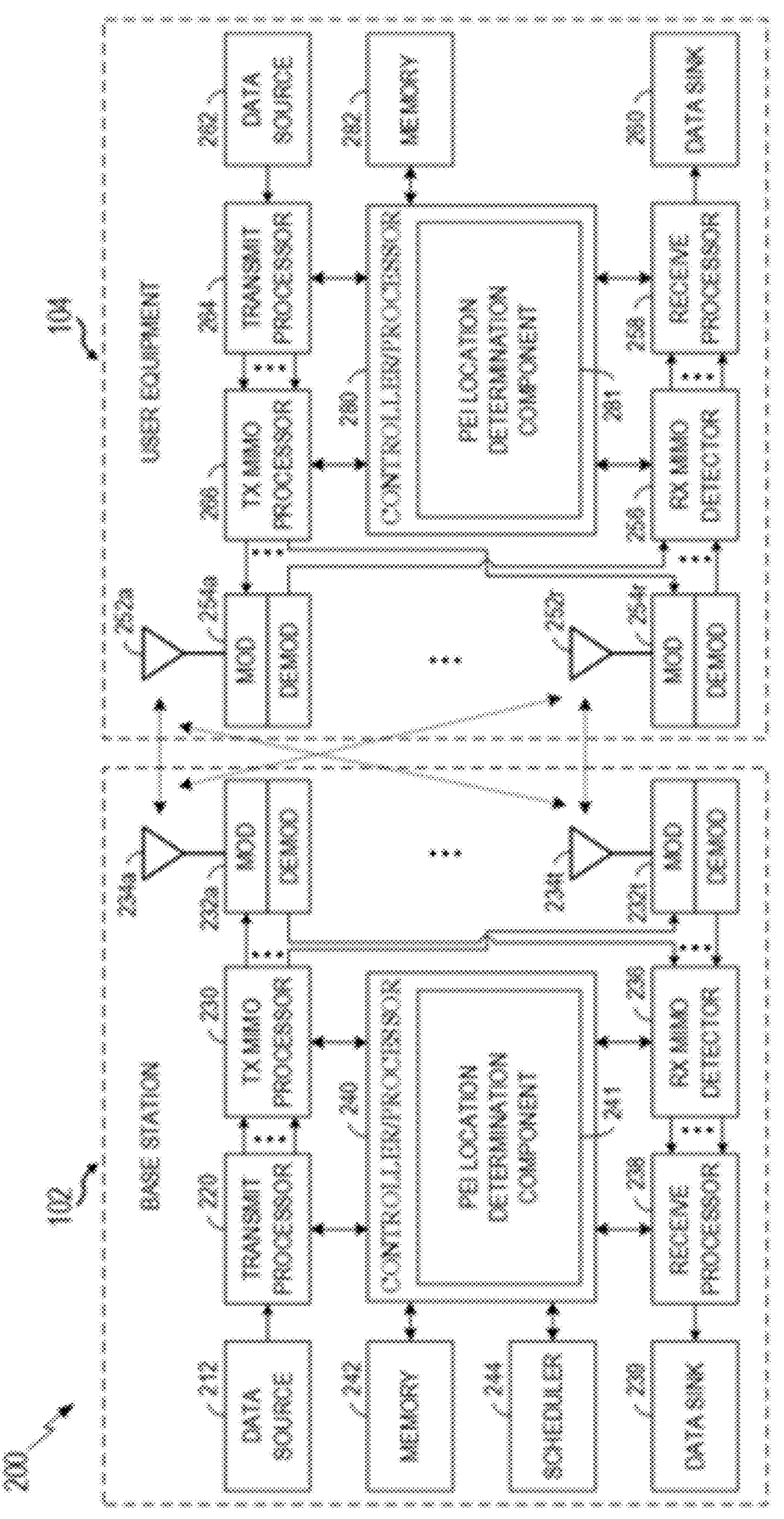
FIG. 2 is a block diagram conceptually illustrating aspects of an example of a base station and user equipment.

FIG. 2 depicts aspects of an example BS 102 and a UE 104. Generally, BS 102 includes various processors (e.g., 220, 230, 238, and 240), antennas 234a-t (collectively 234), transceivers 232a-t (collectively 232), which include modu-lators and demodulators, and other aspects, which enable wireless transmission of data (e.g., data source 212) and wireless reception of data (e.g., data sink 239). For example, BS 102 may send and receive data between itself and UE 104.

BS 102 includes controller/processor 240, which may be configured to implement various functions related to wire-less communications. In the depicted example, controller/processor 240 includes PEI location determination compo-nent 241, which may be representative of PEI location determination component 199 of FIG. 1. Notably, while depicted as an aspect of controller/processor 240, PEI loca-tion determination component 241 may be implemented additionally or alternatively in various other aspects of BS 102 in other implementations.

Generally, UE 104 includes various processors (e.g., 258, 264, 266, and 280), antennas 252a-r (collectively 252), transceivers 254a-r (collectively 254), which include modu-lators and demodulators, and other aspects, which enable wireless transmission of data (e.g., data source 262) and wireless reception of data (e.g., data sink 260).

UE 104 includes controller/processor 280, which may be configured to implement various functions related to wire-less communications. In the depicted example, controller/ processor 280 includes PEI location determination compo-nent 281, which may be representative of PEI location determination component 198 of FIG. 1. Notably, while depicted as an aspect of controller/processor 280, PEI loca-tion determination component 281 may be implemented additionally or alternatively in various other aspects of UE 104 in other implementations.

Figures 3A, 3B, 3C, 3D:
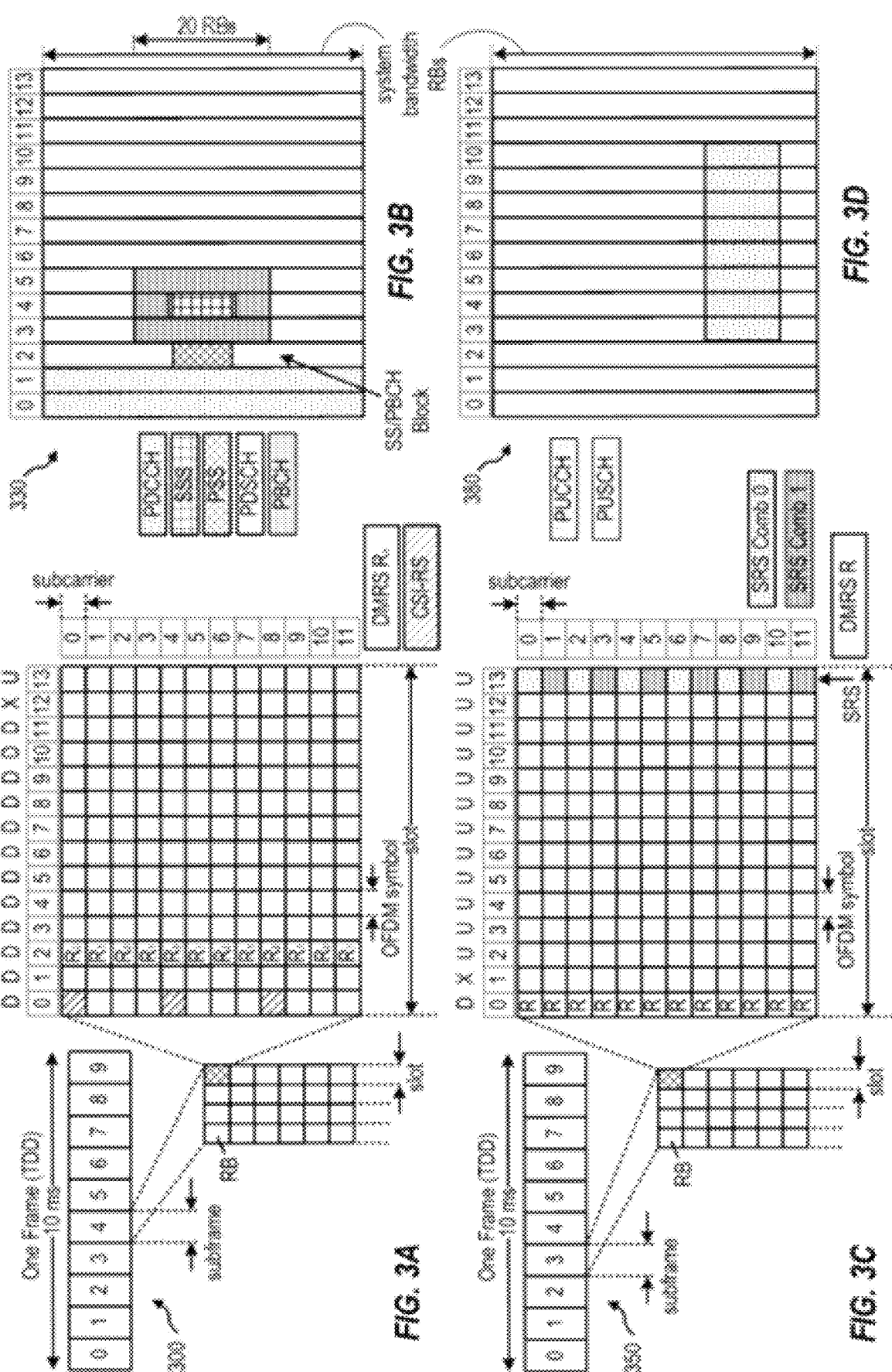
FIGS. 3A, 3B, 3C, and 3D depict various example aspects of data structures for a wireless communication network.

FIGS. 3A, 3B, 3C, and 3D depict aspects of data struc-tures for a wireless communication network, such as wire-less communication network 100 of FIG. 1. In particular, FIG. 3A is a diagram 300 illustrating an example of a first subframe within a 5G (e.g., 5G NR) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe.

Further discussions regarding FIG. 1, FIG. 2, and FIGS. 3A, 3B, 3C, and 3D are provided later in this disclosure.

Introduction to mmWave Wireless Communications

In wireless communications, an electromagnetic spectrum is often subdivided into various classes, bands, channels, or other features. The subdivision is often provided based on wavelength and frequency, where frequency may also be referred to as a carrier, a subcarrier, a frequency channel, a tone, or a subband.

5G networks may utilize several frequency ranges, which in some cases are defined by a standard, such as the 3GPP standards. For example, 3GPP technical standard TS 38.101 currently defines Frequency Range 1 (FR1) as including 600 MHz-6 GHz, though specific uplink and downlink alloca-tions may fall outside of this general range. Thus, FR1 is often referred to (interchangeably) as a "Sub-6 GHz" band.

Similarly, TS 38.101 currently defines Frequency Range 2 (FR2) as including 26-41 GHz, though again specific uplink and downlink allocations may fall outside of this general range. FR2, is sometimes referred to (interchange-ably) as a "millimeter wave" ("mmW" or "mmWave") band, despite being different from the extremely high frequency (EHF) band (30 GHz-300 GHz) that is identified by the International Telecommunications Union (ITU) as a "milli-meter wave" band because wavelengths at these frequencies are between 1 millimeter and 10 millimeters.

Communications using mmWave/near mmWave radio frequency band (e.g., 3 GHz-300 GHz) may have higher path loss and a shorter range compared to lower frequency communications. As described above with respect to FIG. 1, a base station (e.g., 180) configured to communicate using mmWave/near mmWave radio frequency bands may utilize beamforming (e.g., 182) with a UE (e.g., 104) to improve path loss and range.

Aspects Related to PEI Occasion Location Determination

Aspects of the present disclosure provide apparatuses, methods, processing systems, and computer-readable medi-ums for determining the location of physical downlink control channel (PDCCH) monitoring occasions for PEIs.

As noted above, PEIs may allow a UE to save battery power by entering an idle or inactive mode. By monitoring for PEIs, the UE may only monitor subsequent POs for paging if an associated PEI indicates paging for the UE in those POs.

Figure 4:
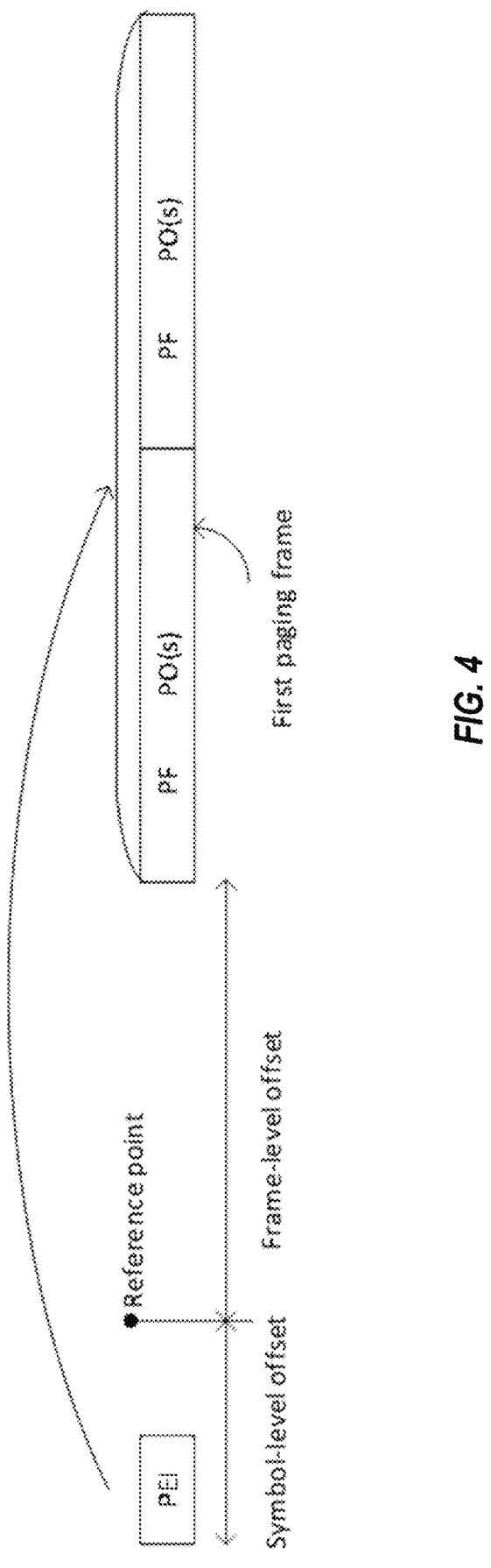
FIG. 4 depicts an example timeline for paging early indication (PEI) occasions and paging occasions (POs), in accordance with certain aspects of the present disclosure.

As illustrated in the timing diagram 400 of FIG. 4, in some systems, one PEI may be used to indicate whether UEs are paged in one or multiple POs across up to two paging frames (PF1 and PF2). As illustrated, the PEI occasion (PEI-O) location could be determined based on frame-level and symbol-level timing offsets to a reference point. In case the PEI is associated with multiple PFs, as in the illustrated example, the frame-level timing offset may be applied to one of the PFs (that may be considered a reference PF).

In the example shown in FIG. 4, PF1 is the reference PF and the reference point is determined by applying the frame-level timing offset from the start of PF1 (and the frame-level timing offset value is 1). The location of the PEI occasion may then be determined by applying the symbol-level timing offset from the reference point to locate the first PDCCH monitoring occasion of the PEI occasion.

As noted above, it might not always be clear which PF is to be used as the reference PF for applying the frame-level timing offset, which may lead a UE to unnecessarily monitor too many PEI occasions or possibly cause the UE to miss a PEI and the corresponding page indicated thereby.

Aspects of the present disclosure provide various techniques for determining the location of PDCCH monitoring occasions for PEIs that are associated with multiple POs in multiple PFs.

PEI location determination in accordance with aspects of the present disclosure may be understood with reference to the call flow diagram 500 of FIG. 5, that assumes a UE served by a gNB.

As illustrated, the gNB may signal the UE configuration for a PEI that indicates, for multiple POs in multiple paging frames (PFs), whether paging PDCCHs are scheduled in the multiple POs.

The UE may determine a location of a PEI occasion based on a reference PF, a frame-level timing offset, and a symbol-level timing offset. FIGS. 6 and 7 illustrate various examples for how the UE may identify a reference PF and determine a location for the PEI occasion therefrom. The UE monitors for a PEI in a configured PEI occasion at the determined location.

In some cases, the network may configure PEI-O locations based on a PDCCH search space set configuration for the PEI. In such cases, the search space set configuration may provide the UE with a periodicity and an offset for a first PDCCH monitoring occasion (PMO) of the PEI-O.

In such cases, the network may configure PFs for the UE in each paging cycle (also called a discontinuous reception or DRX cycle). The UE may evaluate each PF as a potential candidate to serve as a reference PF to apply the frame-level timing offset, in order to determine a location for a PEI-O.

For example, the UE may evaluate a PF by applying the frame-level timing offset and symbol-level timing offset to (a start of) that PF and, to qualify as a valid PF reference candidate, the UE would expect the resulting start location to align with a start of a first PMO of the PEI-O. An example of this evaluation is shown in FIG. 6A and FIG. 6B.

In FIG. 6A, the UE evaluates PF2 as a potential reference PF candidate. As illustrated, when the UE applies the frame-level timing offset and symbol-level timing offset to the start of PF2, the resulting location does not align with a configured PMO of the configured PEI-O. Thus, PF2 is ruled out as a valid reference PF.

As illustrated in FIG. 6B, however, when the UE evaluates PF1 as a potential reference PF candidate, by applying the frame-level timing offset and symbol-level timing offset to the start of PF1, the resulting location does align with a configured PMO of the configured PEI-O. Thus, PF1 is identified as a valid reference PF.

In some cases, if there is no PF configured by the network that satisfies the timing relationship between the start of first PMO of the PEI-O and the PF determined by the frame-level timing offset and symbol-level timing offset, the UE may take some appropriate action. For example, according to first option, the UE may not process its PO (a PO configured for the UE) in the paging cycle. According to a second option, the UE may ignore the PEI and process the paging PDCCH in its PO in the paging cycle. In other words, the UE may ignore the PEI indication or not even monitor for the PEI in the PEI-o and, instead, monitor the paging PDCCH in its PO regardless (with a potential adverse impact on power savings). This may be considered a fallback procedure to a conventional (legacy) paging procedure.

According to the example PEI-O location determination procedure shown in FIGS. 6A and 6B, the UE and network may determine a reference PF and, therefrom, a first PMO of a configured PEI-O based on configured frame-level and symbol-level timing offsets (which may be part of a PEI configuration). In such cases, the network may take measures to ensure the first PF and the first PMO are both configured properly to satisfy the offset between them. In some cases, this may mean taking measures to ensure two independent configurations of PEI PDCCH search space set and paging frame for the UE are compatible.

As described with reference to FIGS. 6A and 6B, a UE may need to perform additional processing efforts to evaluate candidate reference PFs. For example, the UE may hypothetically derive the PEI-O location by either assuming its PF is the reference (first) PF associated with the PEI-O or the PF prior to its PF is the first PF associated with the PEI-O. As described above, the candidate PF that complies (aligns) with PEI PDCCH search space set configuration is used to determine the PEI-O location.

In some cases, the network may configure a frame-level timing offset separately for each PF in a paging cycle. For example, this configuration may be conveyed via a system information block (SIB) for a serving cell. In such cases, a UE may use the frame-level timing offset of its own PF to determine the PEI-O location. In other words, the network may ensure the separately configured frame-level timing offsets result in alignment with the corresponding PEI-O location for a given UE.

Figures 7A, 7B:
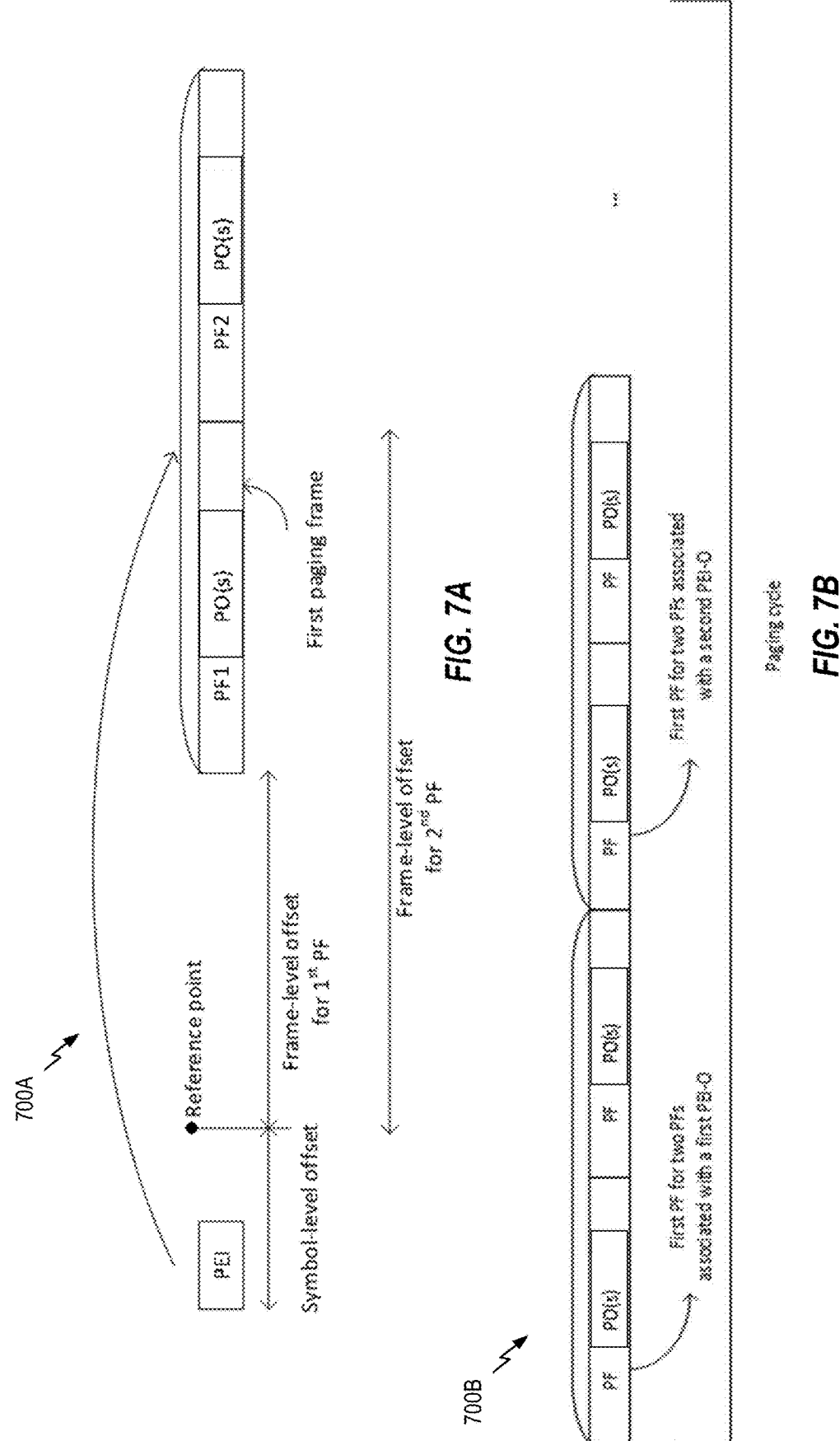
FIG. 7A and FIG. 7B depicts an example timeline for PEI occasion location determination, in accordance with certain aspects of the present disclosure.

FIG. 7A depicts an example timeline for PEI occasion location determination based on separately configured frame-level timing offsets. As illustrated, if PF1 is the PF for the UE, it may apply the (first) frame-level timing offset configured for PF1 to determine the reference point. On the other hand, if PF2 is the PF for the UE, it may apply the (second) frame-level timing offset configured for PF2 to determine the reference point.

Once the reference point is determined by the frame-level timing offset from the start of the PF for the UE, the UE may use the symbol-level timing offset from the reference point to locate the start of the first PDCCH MO of PEI-O to identify the PEI-O location.

In some cases, the network may configure (explicitly indicate) a start offset to determine a reference PF if more than one PF is associated with the PEI-O. The start offset may be indicated according to various options.

According to a first option, the start offset may be defined based on a radio frame number. For example, the reference PF may be determined as:

$$\text{modulo(radio frame number} + \text{start offset}, I_{pf}) = 0,$$

where $I_{pf}$ is the time duration of adjacent PFs associated with the same PEI-O.

According to a first option, the start offset may be defined based on an index of the PF within the paging cycle. For example, the reference PF may be determined as:

$$\text{modulo(index of } PF \text{ within paging cycle+start offset,} \quad N_{pf,PEI})=0;$$

where $N_{pf,\ PEI}$ is the number of PFs associated with the same PEI-O. As an example, if $N_{pf,\ PEI}=2$ and if the start offset is 0, then the reference PF of PF(s) associated with the PEI-O is a PF that has the even PF index. On the other hand, if the start offset is 1, then the first PF of PF(s) associated with the PEI-O is a PF that has the odd PF index. FIG. 7B illustrates an option of a start offset of 0 when two PFs are associated with a PEI-O and start offset is 0.

In some cases, whether a PF has an odd or even index may determine whether that PF is a reference PF. For example, only even numbered PFs (i.e., PFs with an even index) in the paging cycle may be used as a reference PF if two PFs are associated with the same PEI-O. In this case, if a UE's PF has an odd index, the UE would use the PF before this PF as the reference PF. This simple approach may provide flexibility for network configuration while resulting in relatively low UE processing efforts.

Various other optimizations may help ensure a relatively simple network configuration and UE implementation. For example, in some cases, if a PF is associated with one PEI, all POs within the PF may be mapped to the PEI (e.g., mapping POs of a partial PF to one PEI is not supported). As another example, in some cases, if more than one PF is associated with one PEI, all PFs associated with the PEI are within the same paging cycle (e.g., PFs mapping to one PEI from different paging cycles may not be supported).

Various examples described above assumed a PEI that mapped to POs in two PFs (PF1 and PF2). Those skilled in the art will recognize, however, that the PEI-O location determination techniques described herein may be extended to cases where a PEI maps to more than two PFs.

Example Methods

FIG. 8 shows an example of a method 800 for wireless communication according to aspects of the present disclosure. In some aspects, a user equipment, such as UE 104 of FIGS. 1 and 2, or processing system 1005 of FIG. 10, may perform the method 800.

Method 800 begins at step 805 with receiving, from a network entity, a configuration of a PEI that indicates, for multiple POs in multiple PFs, whether paging PDCCHs are scheduled in the multiple POs. In some cases, the operations of this step refer to, or may be performed by, PEI configuration circuitry as described with reference to FIG. 10.

Method 800 then proceeds to step 810 with identifying a reference PF from one of the multiple PFs. In some cases, the operations of this step refer to, or may be performed by, reference PF circuitry as described with reference to FIG. 10.

Method 800 then proceeds to step 815 with monitoring for the PEI in a location of a PEI occasion determined based on the reference PF and at least one timing offset. In some cases, the operations of this step refer to, or may be performed by, PEI monitoring circuitry as described with reference to FIG. 10.

In some aspects, the at least one timing offset comprises a frame-level timing offset and a symbol-level timing offset. In some aspects, the UE determines the location of the PEI occasion by determining a reference point that is the frame-level timing offset before a start of the reference PF and determining a start of the PEI occasion that is the symbol-level timing offset before the reference point. In some aspects, identifying the reference PF comprises identifying one of the multiple PFs whose start is offset, from a configured PMO of the PEI occasion, by the frame-level and symbol-level timing offset.

In some aspects, identifying one of the multiple PFs whose start is offset, from a configured PMO of the PEI occasion, by the frame-level and symbol-level timing offset comprises evaluating candidate PEI occasion locations derived for the multiple PFs, using the frame-level and symbol-level timing offset, to identify the reference PF.

In some aspects, method 800 further includes, if the UE is unable to identify a PF whose start is offset, from the configured PMO of the PEI occasion, by the frame-level and symbol-level timing offset at least one of: skipping a PO and not process a paging PDCCH in a paging cycle, or ignoring the PEI and process a paging PDCCH in the PO in the paging cycle.

In some aspects, a periodicity and offset for the PMO of the PEI occasion are provided by the network entity as part of a search space set configuration. In some aspects, the periodicity and offset provided by the network are for a first PMO of the PEI occasion.

In some aspects, the configuration configures a frame-level timing offset separately for each PF in a paging cycle. In some aspects, identifying the reference PF comprises identifying a PF for a PO of the UE as the reference PF. In some aspects, method 800 further includes using the frame-level timing offset configured for the PF for the PO of the UE to determine the location of the reference point. In some aspects, method 800 further includes using the symbol-level timing offset from the reference point to determine a start of the PEI occasion.

In some aspects, identifying the reference PF is based on a start offset configured by the network entity. In some aspects, the start offset is defined based on a radio frame number. In some aspects, the reference PF is identified based on a modulo function involving the radio frame number, the start offset, and a time duration of the multiple PFs. In some aspects, the start offset is defined based on an index of a PF within a paging cycle. In some aspects, the reference PF is identified based on a modulo function involving the index of the PF within the paging cycle, the start offset, and a number of the multiple PFs.

In some aspects, identifying the reference PF comprises identifying one of the multiple PFs that has an odd index as the reference PF or identifying one of the multiple PFs that has an even index as the reference PF. In some aspects, all POs within the multiple PFs are mapped to the PEI. In some aspects, the multiple PFs are within a same paging cycle.

FIG. 9 shows an example of a method 900 for wireless communication according to aspects of the present disclosure. In some aspects, a base station, such as BS 102 of FIGS. 1 and 2, or processing system 1105 of FIG. 11, may perform the method 900.

Method 900 begins at step 905 with transmitting, to a UE, a configuration of a PEI that indicates, for multiple POs in multiple PFs, whether paging PDCCHs are scheduled in the multiple POs. In some cases, the operations of this step refer to, or may be performed by, PEI configuration circuitry as described with reference to FIG. 11.

Method 900 then proceeds to step 910 with identifying a reference PF from one of the multiple PFs. In some cases, the operations of this step refer to, or may be performed by, reference PF circuitry as described with reference to FIG. 11.

Method 900 then proceeds to step 915 with transmitting a PEI in a location of a PEI occasion determined based on the reference PF and at least one timing offset. In some cases, the operations of this step refer to, or may be performed by, PEI transmission circuitry as described with reference to FIG. 11.

In some aspects, the at least one timing offset comprises a frame-level timing offset and a symbol-level timing offset. In some aspects, the network entity determines the location of the PEI occasion by determining a reference point that is the frame-level timing offset before a start of the reference PF and determining a start of the PEI occasion that is the symbol-level timing offset before the reference point.

In some aspects, identifying the reference PF comprises identifying one of the multiple PFs whose start is offset, from a configured PMO of the PEI occasion, by the frame-level and symbol-level timing offset. In some aspects, a periodicity and offset for the PMO of the PEI occasion are provided by the network entity as part of a search space set configuration. In some aspects, the periodicity and offset provided by the network are for a first PMO of the PEI occasion.

In some aspects, the configuration configures a frame-level timing offset separately for each PF in a paging cycle. In some aspects, identifying the reference PF comprises identifying a PF for a PO of the UE as the reference PF. In some aspects, method 900 further includes using the frame-level timing offset configured for the PF for the PO of the UE to determine the location of the reference point. In some aspects, method 900 further includes using the symbol-level timing offset from the reference point to determine a start of the PEI occasion.

In some aspects, identifying the reference PF is based on a start offset configured by the network entity. In some aspects, the start offset is defined based on a radio frame number. In some aspects, the reference PF is identified based on a modulo function involving the radio frame number, the start offset, and a time duration of the multiple PFs.

In some aspects, the start offset is defined based on an index of a PF within a paging cycle. In some aspects, the reference PF is identified based on a modulo function involving the index of the PF within the paging cycle, the start offset, and a number of the multiple PFs.

In some aspects, identifying the reference PF comprises identifying one of the multiple PFs that has an odd index as the reference PF or identifying one of the multiple PFs that has an even index as the reference PF. In some aspects, all POs within the multiple PFs are mapped to the PEI. In some aspects, the multiple PFs are within a same paging cycle.

Example Wireless Communication Device

Figure 10:
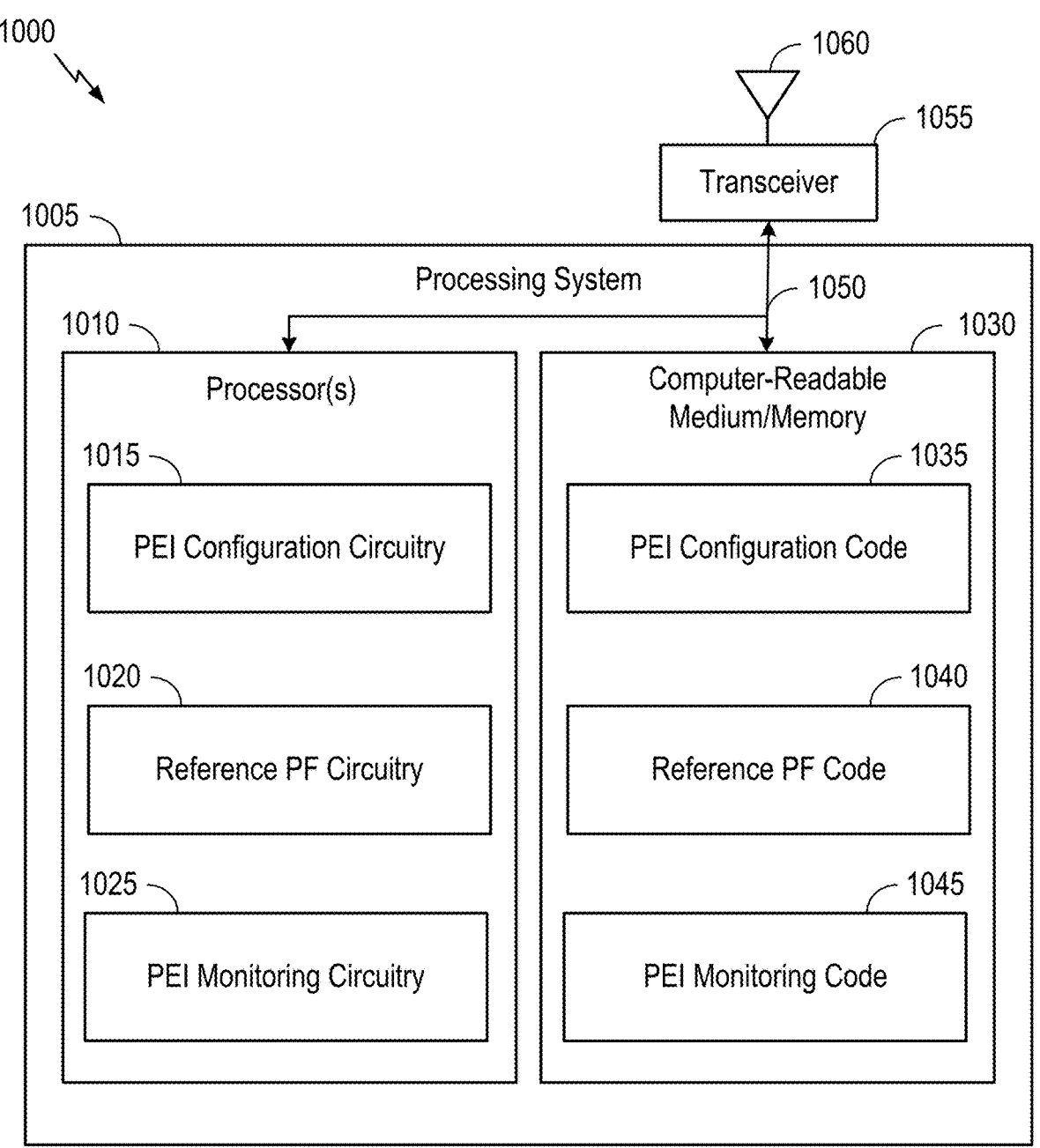
FIGS. 10 and 11 depict example communication devices according to aspects of the present disclosure.

FIG. 10 depicts an example communications device 1000 that includes various components operable, configured, or adapted to perform operations for the techniques disclosed herein, such as the operations depicted and described with respect to FIG. 8. In some examples, communication device 1000 may be a UE 104 as described, for example with respect to FIGS. 1 and 2.

Communications device 1000 includes a processing system 1005 coupled to the transceiver 1055 (e.g., a transmitter and/or a receiver). The transceiver 1055 is configured to transmit (or send) and receive signals for the communications device 1000 via the antenna 1060, such as the various signals as described herein. The transceiver 1055 may communicate bi-directionally, via the antennas 1060, wired links, or wireless links as described herein. For example, the transceiver 1055 may represent a wireless transceiver and may communicate bi-directionally with another wireless transceiver. The transceiver 1055 may also include or be connected to a modem to modulate the packets and provide the modulated packets to for transmission, and to demodulate received packets. In some examples, the transceiver 1055 may be tuned to operate at specified frequencies. For example, a modem can configure the transceiver 1055 to operate at a specified frequency and power level based on the communication protocol used by the modem.

Processing system 1005 may be configured to perform processing functions for communications device 1000, including processing signals received and/or to be transmitted by communications device 1000. Processing system 1005 includes one or more processors 1010 coupled to a computer-readable medium/memory 1030 via a bus 1050.

In some examples, one or more processors 1010 may include one or more intelligent hardware devices, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the one or more processors 1010 are configured to operate a memory array using a memory controller. In other cases, a memory controller is integrated into the one or more processors 1010. In some cases, the one or more processors 1010 are configured to execute computer-readable instructions stored in a memory to perform various functions. In some aspects, one or more processors 1010 include special purpose components for modem processing, baseband processing, digital signal processing, or transmission processing.

In certain aspects, computer-readable medium/memory 1030 is configured to store instructions (e.g., computer-executable code) that when executed by the one or more processors 1010, cause the one or more processors 1010 to perform the operations illustrated in FIG. 8, or other operations for performing the various techniques discussed herein.

In one aspect, computer-readable medium/memory 1030 includes PEI configuration code 1035, reference PF code 1040, and PEI monitoring code 1045.

Examples of a computer-readable medium/memory 1030 include random access memory (RAM), read-only memory (ROM), solid state memory, a hard drive, a hard disk drive, etc. In some examples, computer-readable medium/memory 1030 is used to store computer-readable, computer-executable software including instructions that, when executed, cause a processor to perform various functions described herein. In some cases, the memory contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

Various components of communications device 1000 may provide means for performing the methods described herein, including with respect to FIG. 8.

In some examples, means for transmitting or sending (or means for outputting for transmission) may include transceivers 254 and/or antenna(s) 252 of the UE 104 illustrated in FIG. 2 and/or the transceiver 1055 and the antenna 1060 of the communication device in FIG. 10.

In some examples, means for receiving (or means for obtaining) may include transceivers 254 and/or antenna(s) 252 of the UE 104 illustrated in FIG. 2 and/or the transceiver 1055 and the antenna 1060 of the communication device in FIG. 10.

In some examples, means for performing various operations described herein may include various processing system 1005 components, such as: the one or more processors 1010 in FIG. 10, or aspects of the UE 104 depicted in FIG. 2, including receive processor 258, transmit processor 264, TX MIMO processor 266, and/or controller/processor 280 (including PEI location determination component 281).

In one aspect, one or more processors 1010 includes PEI configuration circuitry 1015, reference PF circuitry 1020, and PEI monitoring circuitry 1025.

According to some aspects, PEI configuration circuitry 1015 receives, from a network entity, a configuration of a PEI that indicates, for multiple POs in multiple PFs, whether paging PDCCHs are scheduled in the multiple POs. In some aspects, all POs within the multiple PFs are mapped to the PEI. In some aspects, the multiple PFs are within a same paging cycle.

According to some aspects, reference PF circuitry 1020 identifies a reference PF from one of the multiple PFs.

According to some aspects, PEI monitoring circuitry 1025 monitors for the PEI in a location of a PEI occasion determined based on the reference PF and at least one timing offset. In some aspects, the at least one timing offset comprises a frame-level timing offset and a symbol-level timing offset. In some aspects, the UE determines the location of the PEI occasion by determining a reference point that is the frame-level timing offset before a start of the reference PF and determining a start of the PEI occasion that is the symbol-level timing offset before the reference point.

In some aspects, identifying the reference PF comprises identifying one of the multiple PFs whose start is offset, from a configured PMO of the PEI occasion, by the frame-level and symbol-level timing offset. In some aspects, identifying one of the multiple PFs whose start is offset, from a configured PMO of the PEI occasion, by the frame-level and symbol-level timing offset comprises evaluating candidate PEI occasion locations derived for the multiple PFs, using the frame-level and symbol-level timing offset, to identify the reference PF. In some examples (e.g., if the UE is unable to identify a PF whose start is offset, from the configured PMO of the PEI occasion, by the frame-level and symbol-level timing offset), PEI configuration circuitry 1015 skips a PO and not process a paging PDCCH in a paging cycle, ignores the PEI and process a paging PDCCH in the PO in the paging cycle, or both.

In some aspects, a periodicity and offset for the PMO of the PEI occasion are provided by the network entity as part of a search space set configuration. In some aspects, the periodicity and offset provided by the network are for a first PMO of the PEI occasion. In some aspects, the configuration configures a frame-level timing offset separately for each PF in a paging cycle. In some aspects, identifying the reference PF comprises identifying a PF for a PO of the UE as the reference PF. In some examples, PEI configuration circuitry 1015 uses the frame-level timing offset configured for the PF for the PO of the UE to determine the location of the reference point. In some examples, PEI configuration circuitry 1015 uses the symbol-level timing offset from the reference point to determine a start of the PEI occasion.

In some aspects, reference PF circuitry 1020 identifies the reference PF based on a start offset configured by the network entity. In some aspects, the start offset is defined based on a radio frame number. In some aspects, the reference PF is identified based on a modulo function involving the radio frame number, the start offset, and a time duration of the multiple PFs. In some aspects, the start offset is defined based on an index of a PF within a paging cycle. In some aspects, the reference PF is identified based on a modulo function involving the index of the PF within the paging cycle, the start offset, and a number of the multiple PFs. In some aspects, identifying the reference PF comprises identifying one of the multiple PFs that has an odd index as the reference PF or identifying one of the multiple PFs that has an even index as the reference PF.

Notably, FIG. 10 is just one example, and many other examples and configurations of communication device are possible.

Figure 11:
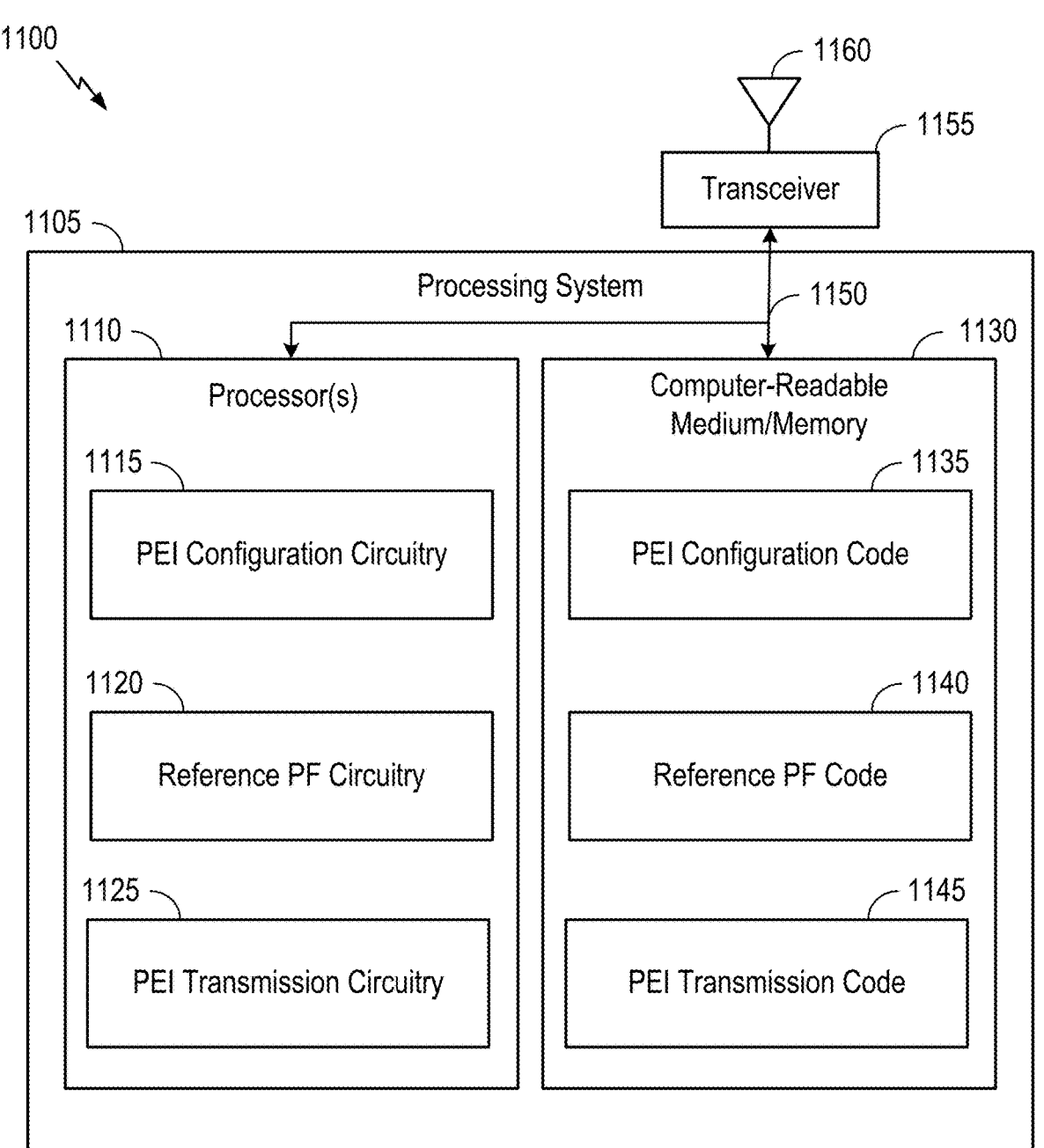

FIG. 11 depicts an example communications device 1100 that includes various components operable, configured, or adapted to perform operations for the techniques disclosed herein, such as the operations depicted and described with respect to FIG. 9. In some examples, communication device may be a BS 102 as described, for example with respect to FIGS. 1 and 2.

Communications device 1100 includes a processing system 1105 coupled to the transceiver 1155 (e.g., a transmitter and/or a receiver). The transceiver 1155 is configured to transmit (or send) and receive signals for the communications device 1100 via the antenna 1160, such as the various signals as described herein. The transceiver 1155 may communicate bi-directionally, via the antennas 1160, wired links, or wireless links as described herein. For example, the transceiver 1155 may represent a wireless transceiver and may communicate bi-directionally with another wireless transceiver. The transceiver 1155 may also include or be connected to a modem to modulate the packets and provide the modulated packets to for transmission, and to demodulate received packets. In some examples, the transceiver 1155 may be tuned to operate at specified frequencies. For example, a modem can configure the transceiver 1155 to operate at a specified frequency and power level based on the communication protocol used by the modem.

Processing system 1105 may be configured to perform processing functions for communications device 1100, including processing signals received and/or to be transmitted by communications device 1100. Processing system 1105 includes one or more processors 1110 coupled to a computer-readable medium/memory 1130 via a bus 1150.

In some examples, one or more processors 1110 may include one or more intelligent hardware devices, (e.g., a general-purpose processing component, a DSP, a CPU, a GPU, a microcontroller, an ASIC, a FPGA, a programmable logic device, a discrete gate or transistor logic component, a discrete hardware component, or any combination thereof). In some cases, the one or more processors 1110 are configured to operate a memory array using a memory controller. In other cases, a memory controller is integrated into the one or more processors 1110. In some cases, the one or more processors 1110 are configured to execute computer-readable instructions stored in a memory to perform various functions. In some aspects, one or more processors 1110 include special purpose components for modem processing, baseband processing, digital signal processing, or transmission processing.

In certain aspects, computer-readable medium/memory 1130 is configured to store instructions (e.g., computer-executable code) that when executed by the one or more processors 1110, cause the one or more processors 1110 to perform the operations illustrated in FIG. 9, or other operations for performing the various techniques discussed herein.

In one aspect, computer-readable medium/memory 1130 includes PEI configuration code 1135, reference PF code 1140, and PEI transmission code 1145.

Examples of a computer-readable medium/memory 1130 include RAM, ROM, solid state memory, a hard drive, a hard disk drive, etc. In some examples, computer-readable medium/memory 1130 is used to store computer-readable, computer-executable software including instructions that, when executed, cause a processor to perform various functions described herein. In some cases, the memory contains, among other things, a BIOS which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

Various components of communications device 1100 may provide means for performing the methods described herein, including with respect to FIG. 9.

In some examples, means for transmitting or sending (or means for outputting for transmission) may include transceivers 232 and/or antenna(s) 234 of the BS 102 illustrated in FIG. 2 and/or the transceiver 1155 and the antenna 1160 of the communication device in FIG. 11.

In some examples, means for receiving (or means for obtaining) may include transceivers 232 and/or antenna(s) 234 of the BS 102 illustrated in FIG. 2 and/or the transceiver 1155 and the antenna 1160 of the communication device in FIG. 11.

In some examples, means for performing various operations described herein may include various processing system 1105 components, such as: the one or more processors 1110 in FIG. 11, or aspects of the BS 102 depicted in FIG. 2, including receive processor 238, transmit processor 220, TX MIMO processor 230, and/or controller/processor 240 (including PEI location determination component 241).

In one aspect, one or more processors 1110 includes PEI configuration circuitry 1115, reference PF circuitry 1120, and PEI transmission circuitry 1125.

According to some aspects, PEI configuration circuitry 1115 transmits, to a UE, a configuration of a PEI that indicates, for multiple POs in multiple PFs, whether paging PDCCHs are scheduled in the multiple POs. In some aspects, all POs within the multiple PFs are mapped to the PEI. In some aspects, the multiple PFs are within a same paging cycle.

According to some aspects, reference PF circuitry 1120 identifies a reference PF from one of the multiple PFs.

According to some aspects, PEI transmission circuitry 1125 transmits a PEI in a location of a PEI occasion determined based on the reference PF and at least one timing offset. In some aspects, the at least one timing offset comprises a frame-level timing offset and a symbol-level timing offset. In some aspects, the network entity determines the location of the PEI occasion by determining a reference point that is the frame-level timing offset before a start of the reference PF and determining a start of the PEI occasion that is the symbol-level timing offset before the reference point. In some aspects, identifying the reference PF comprises identifying one of the multiple PFs whose start is offset, from a configured PMO of the PEI occasion, by the frame-level and symbol-level timing offset. In some aspects, a periodicity and offset for the PMO of the PEI occasion are provided by the network entity as part of a search space set configuration. In some aspects, the periodicity and offset provided by the network are for a first PMO of the PEI occasion. In some aspects, the configuration configures a frame-level timing offset separately for each PF in a paging cycle. In some aspects, identifying the reference PF comprises identifying a PF for a PO of the UE as the reference PF. In some examples, PEI configuration circuitry 1115 uses the frame-level timing offset configured for the PF for the PO of the UE to determine the location of the reference point. In some examples, PEI configuration circuitry 1115 uses the symbol-level timing offset from the reference point to determine a start of the PEI occasion.

In some aspects, reference PF circuitry 1120 identifies the reference PF based on a start offset configured by the network entity. In some aspects, the start offset is defined based on a radio frame number. In some aspects, the reference PF is identified based on a modulo function involving the radio frame number, the start offset, and a time duration of the multiple PFs. In some aspects, the start offset is defined based on an index of a PF within a paging cycle. In some aspects, the reference PF is identified based on a modulo function involving the index of the PF within the paging cycle, the start offset, and a number of the multiple PFs. In some aspects, identifying the reference PF comprises identifying one of the multiple PFs that has an odd index as the reference PF or identifying one of the multiple PFs that has an even index as the reference PF.

Notably, FIG. 11 is just one example, and many other examples and configurations of communication device are possible.

Example Clauses

Implementation examples are described in the following numbered clauses:

Clause 1: A method of wireless communication by a user equipment, the method comprising: receiving, from a network entity, a configuration of a PEI that indicates, for multiple POs in multiple PFs, whether paging PDCCHs are scheduled in the multiple POs; identifying a reference PF from one of the multiple PFs; and monitoring for the PEI in a location of a PEI occasion determined based on the reference PF and at least one timing offset.

Clause 2: The method of Clause 1, wherein the at least one timing offset comprises a frame-level timing offset and a symbol-level timing offset; and the UE determines the location of the PEI occasion by determining a reference point that is the frame-level timing offset before a start of the reference PF and determining a start of the PEI occasion that is the symbol-level timing offset before the reference point.

Clause 3: The method of Clause 2, wherein identifying the reference PF comprises identifying one of the multiple PFs whose start is offset, from a configured PMO of the PEI occasion, by the frame-level and symbol-level timing offset.

Clause 4: The method of Clause 3, wherein identifying one of the multiple PFs whose start is offset, from a configured PMO of the PEI occasion, by the frame-level and symbol-level timing offset comprises: evaluating candidate PEI occasion locations derived for the multiple PFs, using the frame-level timing offset and symbol-level timing offset, to identify the reference PF.

Clause 5: The method of Clause 4, further comprising, if the UE is unable to identify a PF whose start is offset, from the configured PMO of the PEI occasion, by the frame-level timing offset and symbol-level timing offset at least one of: skipping a PO and not process a paging PDCCH in a paging cycle; or ignoring the PEI and process a paging PDCCH in the PO in the paging cycle.

Clause 6: The method of Clause 3, wherein a periodicity and offset for the PMO of the PEI occasion are provided by the network entity as part of a search space set configuration.

Clause 7: The method of Clause 6, wherein the periodicity and offset provided by the network are for a first PMO of the PEI occasion.

Clause 8: The method of Clause 2, wherein the configuration configures a frame-level timing offset separately for each PF in a paging cycle; and identifying the reference PF comprises identifying a PF for a PO of the UE as the reference PF.

Clause 9: The method of Clause 8, further comprising: using the frame-level timing offset configured for the PF for the PO of the UE to determine the location of the reference point; and using the symbol-level timing offset from the reference point to determine a start of the PEI occasion.

Clause 10: The method of any one of Clauses 1-9, wherein identifying the reference PF is based on a start offset configured by the network entity.

Clause 11: The method of Clause 10, wherein the start offset is defined based on a radio frame number; and the reference PF is identified based on a modulo function involving the radio frame number, the start offset, and a time duration of the multiple PFs.

Clause 12: The method of Clause 10, wherein the start offset is defined based on an index of a PF within a paging cycle; and the reference PF is identified based on a modulo function involving the index of the PF within the paging cycle, the start offset, and a number of the multiple PFs.

Clause 13: The method of any one of Clauses 1-12, wherein identifying the reference PF comprises: identifying one of the multiple PFs that has an odd index as the reference PF; or identifying one of the multiple PFs that has an even index as the reference PF.

Clause 14: The method of any one of Clauses 1-13, wherein all POs within the multiple PFs are mapped to the PEI.

Clause 15: The method of any one of Clauses 1-14, wherein the multiple PFs are within a same paging cycle.

Clause 16: A method of wireless communication by a network entity, the method comprising: transmitting, to a UE, a configuration of a PEI that indicates, for multiple POs in multiple PFs, whether paging PDCCHs are scheduled in the multiple POs; identifying a reference PF from one of the multiple PFs; and transmitting a PEI in a location of a PEI occasion determined based on the reference PF and at least one timing offset.

Clause 17: The method of Clause 16, wherein the at least one timing offset comprises a frame-level timing offset and a symbol-level timing offset; and the network entity determines the location of the PEI occasion by determining a reference point that is the frame-level timing offset before a start of the reference PF and determining a start of the PEI occasion that is the symbol-level timing offset before the reference point.

Clause 18: The method of Clause 17, wherein identifying the reference PF comprises identifying one of the multiple PFs whose start is offset, from a configured PMO of the PEI occasion, by the frame-level timing offset and symbol-level timing offset.

Clause 19: The method of Clause 18, wherein a periodicity and offset for the PMO of the PEI occasion are provided by the network entity as part of a search space set configuration.

Clause 20: The method of Clause 19, wherein the periodicity and offset provided by the network are for a first PMO of the PEI occasion.

Clause 21: The method of Clause 17, wherein the configuration configures a frame-level timing offset separately for each PF in a paging cycle; and identifying the reference PF comprises identifying a PF for a PO of the UE as the reference PF.

Clause 22: The method of Clause 21, further comprising: using the frame-level timing offset configured for the PF for the PO of the UE to determine the location of the reference point; and using the symbol-level timing offset from the reference point to determine a start of the PEI occasion.

Clause 23: The method of any one of Clauses 16-22, wherein identifying the reference PF is based on a start offset configured by the network entity.

Clause 24: The method of Clause 23, wherein the start offset is defined based on a radio frame number; and the reference PF is identified based on a modulo function involving the radio frame number, the start offset, and a time duration of the multiple PFs.

Clause 25: The method of Clause 24, wherein the start offset is defined based on an index of a PF within a paging cycle; and the reference PF is identified based on a modulo function involving the index of the PF within the paging cycle, the start offset, and a number of the multiple PFs.

Clause 26: The method of any one of Clauses 16-25, wherein identifying the reference PF comprises: identifying one of the multiple PFs that has an odd index as the reference PF; or identifying one of the multiple PFs that has an even index as the reference PF.

Clause 27: The method of any one of Clauses 16-26, wherein all POs within the multiple PFs are mapped to the PEI.

Clause 28: The method of any one of Clauses 16-27, wherein the multiple PFs are within a same paging cycle.

Clause 29: A processing system, comprising: a memory comprising computer-executable instructions; one or more processors configured to execute the computer-executable instructions and cause the processing system to perform a method in accordance with any one of Clauses 1-28.

Clause 30: A processing system, comprising means for performing a method in accordance with any one of Clauses 1-28.

Clause 31: A non-transitory computer-readable medium comprising computer-executable instructions that, when executed by one or more processors of a processing system, cause the processing system to perform a method in accordance with any one of Clauses 1-28.

Clause 32: A computer program product embodied on a computer-readable storage medium comprising code for performing a method in accordance with any one of Clauses 1-28.

Additional Wireless Communication Network Considerations

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmWave), machine type communications (MTC), and/or mission critical targeting ultra-reliable, low-latency communications (URLLC). These services, and others, may include latency and reliability requirements.

Returning to FIG. 1, various aspects of the present disclosure may be performed within the example wireless communication network 100.

In 3GPP, the term "cell" can refer to a coverage area of a NodeB and/or a narrowband subsystem serving this coverage area, depending on the context in which the term is used. In NR systems, the term "cell" and BS, next generation NodeB (gNB or gNodeB), access point (AP), distributed unit (DU), carrier, or transmission reception point may be used interchangeably. A BS may provide communication coverage for a macro cell, a pico cell, a femto cell, and/or other types of cells.

A macro cell may generally cover a relatively large geographic area (e.g., several kilometers in radius) and may allow unrestricted access by UEs with service subscription. A pico cell may cover a relatively small geographic area (e.g., a sports stadium) and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG) and UEs for users in the home). A BS for a macro cell may be referred to as a macro BS. A BS for a pico cell may be referred to as a pico BS. A BS for a femto cell may be referred to as a femto BS, home BS, or a home NodeB.

BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some base stations, such as BS 180 (e.g., gNB) may operate in a traditional sub-6 GHz spectrum, in millimeter wave (mmWave) frequencies, and/or near mmWave frequencies in communication with the UE 104. When the BS 180 operates in mmWave or near mmWave frequencies, the BS 180 may be referred to as an mmWave base station.

The communication links 120 between BSs 102 and, for example, UEs 104, may be through one or more carriers. For example, BSs 102 and UEs 104 may use spectrum up to Y MHz (e.g., 5, 10, 15, 20, 100, 400, and other MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Wireless communication network 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a PSSCH, and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and may be responsible for session management (start/stop) and for collecting eMBMS related charging information.

5GC 190 may include an Access and Mobility Management Function (AMF) 192, other AMFs 193, a Session Management Function (SMF) 194, and a User Plane Function (UPF) 195. AMF 192 may be in communication with a Unified Data Management (UDM) 196.

AMF 192 is generally the control node that processes the signaling between UEs 104 and 5GC 190. Generally, AMF 192 provides QoS flow and session management.

All user Internet protocol (IP) packets are transferred through UPF 195, which is connected to the IP Services 197, and which provides UE IP address allocation as well as other functions for 5GC 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communication network 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), and others. The data may be for the physical downlink shared channel (PDSCH), in some examples.

A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a PSSCH.

Transmit processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH DMRS, and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At UE 104, antennas 252a-252r may receive the downlink signals from the BS 102 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM) to obtain received symbols.

MIMO detector 256 may obtain received symbols from all the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the physical uplink shared channel (PUSCH)) from a data source 262 and control information (e.g., for the physical uplink control channel (PUCCH) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM), and transmitted to BS 102.

At BS 102, the uplink signals from UE 104 may be received by antennas 234a-t, processed by the demodulators in transceivers 232a-232t, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

5G may utilize orthogonal frequency division multiplexing (OFDM) with a cyclic prefix (CP) on the uplink and downlink. 5G may also support half-duplex operation using time division duplexing (TDD). OFDM and single-carrier frequency division multiplexing (SC-FDM) partition the system bandwidth into multiple orthogonal subcarriers, which are also commonly referred to as tones and bins. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a RB, may be 12 consecutive subcarriers in some examples. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, and others).

As above, FIGS. 3A, 3B, 3C, and 3D depict various example aspects of data structures for a wireless communication network, such as wireless communication network 100 of FIG. 1.

In various aspects, the 5G frame structure may be frequency division duplex (FED), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through RRC signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies ($\mu$) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology p, there are 14 symbols/slot and 2p slots/subframe. The subcarrier spacing and symbol length/duration are a function of the numerology. The subcarrier spacing may be equal to $2^1 \times 15$ kHz, where p is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 3A, 3B, 3C, and 3D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s.

A resource grid may be used to represent the frame structure. Each time slot includes a RB (also referred to as physical RBs (PRBs)) that extends 12 consecutive subcarriers. The resource grid is divided into multiple REs. The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Additional Considerations

The preceding description provides examples of PEI location determination in communication systems. The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, and others. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, and others. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the physical (PHY) layer. In the case of a user equipment (as in the example UE 104 of FIG. 1), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method of wireless communication at a user equipment (UE), comprising:

receiving a configuration of a paging early indication (PEI) for multiple paging occasions (POs) in multiple paging frames (PFs);

identifying a reference PF from one of the multiple PFs; and monitoring for the PEI in a location of a PEI occasion determined based on at least a frame-level timing offset with respect to a start of the reference PF.

2. The method of claim 1, further comprising determining a reference point, wherein the reference point is at the frame-level timing offset from the start of the reference PF.

3. The method of claim 2, wherein the location of the PEI occasion is a symbol-level timing offset from the reference point.

4. The method of claim 3, wherein identifying the reference PF comprises identifying one of the multiple PFs whose start is offset, from a configured physical downlink control channel (PDCCH) monitoring occasion (PMO) of the PEI occasion, by the frame-level timing offset and symbol-level timing offset.

5. The method of claim 1, wherein identifying the reference PF is based on a start offset configured by a network entity.

6. The method of claim 1, wherein the configuration of the PEI indicates, for the multiple POs in the multiple PFs, whether one or more paging physical downlink control channels (PDCCHs) are scheduled in the multiple POs.

7. A method of wireless communication at a user equipment (UE), comprising:

receiving a configuration of a paging early indication (PEI) for multiple paging occasions (POs) in multiple paging frames (PFs);

identifying a reference PF from one of the multiple PFs; and monitoring for the PEI in a location of a PEI occasion determined based on a reference point and a symbol-level timing offset, wherein the reference point is at a frame-level timing offset from the reference PF and the symbol-level timing offset is from the reference point to the location of the PEI occasion.

8. The method of claim 7, wherein the reference point is at the frame-level timing offset from a start of the reference PF.

9. The method of claim 7, wherein identifying the reference PF comprises identifying one of the multiple PFs whose start is offset, from a configured physical downlink control channel (PDCCH) monitoring occasion (PMO) of the PEI occasion, by the frame-level timing offset and the symbol-level timing offset.

10. The method of claim 7, wherein identifying the reference PF is based on a start offset configured by a network entity.

11. The method of claim 7, wherein the configuration of the PEI indicates, for the multiple POs in the multiple PFs, whether one or more paging physical downlink control channels (PDCCHs) are scheduled in the multiple POs.

12. A user equipment (UE) configured for wireless communications, comprising memory coupled to one or more processors, wherein the one or more processors are configured to cause the UE to:

receive a configuration of a paging early indication (PEI) for multiple paging occasions (POs) in multiple paging frames (PFs);

identify a reference PF from one of the multiple PFs; and monitor for the PEI in a location of a PEI occasion determined based on at least a frame-level timing offset with respect to a start of the reference PF.

13. The UE of claim 12, wherein the one or more processors are configured to cause the UE to determine a reference point, wherein the reference point is at the frame-level timing offset from the start of the reference PF.

14. The UE of claim 13, wherein the location of the PEI occasion is a symbol-level timing offset from the reference point.

15. The UE of claim 14, wherein the one or more processors are configured to cause the UE to identify one of the multiple PFs whose start is offset, from a configured physical downlink control channel (PDCCH) monitoring occasion (PMO) of the PEI occasion, by the frame-level timing offset and the symbol-level timing offset.

16. The UE of claim 12, wherein the one or more processors are configured to cause the UE to identify the reference PF based on a start offset configured by a network entity.

17. The UE of claim 12, wherein the configuration of the PEI indicates, for the multiple POs in the multiple PFs, whether one or more paging physical downlink control channels (PDCCHs) are scheduled in the multiple POs.

18. A user equipment (UE) configured for wireless communications, comprising memory coupled to one or more processors, wherein the one or more processors are configured to cause the UE to:

receive a configuration of a paging early indication (PEI) for multiple paging occasions (POs) in multiple paging frames (PFs);

identify a reference PF from one of the multiple PFs; and monitor for the PEI in a location of a PEI occasion determined based on a reference point and a symbol-level timing offset, wherein the reference point is at a frame-level timing offset from the reference PF and the symbol-level timing offset is from the reference point to the location of the PEI occasion.

19. The UE of claim 18, wherein the reference point is at the frame-level timing offset from a start of the reference PF.

20. The UE of claim 18, wherein the one or more processors are configured to cause the UE to identify one of the multiple PFs whose start is offset, from a configured physical downlink control channel (PDCCH) monitoring occasion (PMO) of the PEI occasion, by the frame-level timing offset and the symbol-level timing offset.

21. The UE of claim 18, wherein the one or more processors are configured to cause the UE to identify the reference PF based on a start offset configured by a network entity.

22. The UE of claim 18, wherein the configuration of the PEI indicates, for the multiple POs in the multiple PFs, whether one or more paging physical downlink control channels (PDCCHs) are scheduled in the multiple POs.

\* \* \* \* \*